United States Patent
Zhang et al.

(10) Patent No.: US 11,423,051 B2
(45) Date of Patent: Aug. 23, 2022

(54) SENSOR SIGNAL PREDICTION AT UNREPORTED TIME PERIODS

(71) Applicants: International Business Machines Corporation, Armonk, NY (US); Arizona Board of Regents on Behalf of the University of Arizona, Tucson, AZ (US); Texas A&M University System, College Station, TX (US)

(72) Inventors: Bing Zhang, College Station, TX (US); Shubhi Asthana, San Jose, CA (US); Aly Megahed, San Jose, CA (US); Alaa Elwany, College Station, TX (US); Mohammed Saeed Abuelmakarm Shafae, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 17/075,035

(22) Filed: Oct. 20, 2020

(65) Prior Publication Data

US 2022/0122744 A1   Apr. 21, 2022

(51) Int. Cl.
*H04L 12/00* (2006.01)
*G06F 16/28* (2019.01)
(Continued)

(52) U.S. Cl.
CPC ........... *G06F 16/283* (2019.01); *G06N 7/005* (2013.01); *G16Y 30/00* (2020.01); *G16Y 40/35* (2020.01); *H04L 67/12* (2013.01)

(58) Field of Classification Search
CPC ........ G06N 7/005; G06N 7/00; G06F 16/283; G06F 16/28; G16Y 30/00; G16Y 40/35; H04L 67/12
(Continued)

(56) References Cited

U.S. PATENT DOCUMENTS 10,826,932 B2 * 11/2020 Abbaszadeh ....... H04L 63/1433
2016/0261465 A1 9/2016 Gupta
(Continued)

FOREIGN PATENT DOCUMENTS

CN    104200113 A    12/2014
WO    20182330361 W    12/2018

OTHER PUBLICATIONS

Gotway et al., "Combining Incompatible Spatial Data," Journal of the American Statistical Association, Jun. 2002, vol. 97, No. 458, Review Paper, pp. 632-648.
(Continued)

*Primary Examiner* — Frantz Coby
(74) *Attorney, Agent, or Firm* — Jorge R. Maranto

(57) ABSTRACT

A method, a computer program product, and a system for predicting low-frequency sensor signal predictions using a hierarchical prediction model. The method includes receiving a historical dataset of high-frequency sensor signal data and low-frequency sensor signal data. The method also includes generating a Gaussian process regression model using the historical dataset and sensor parameters and outputting high-frequency sensor signal predictions. The method also includes generating a hierarchical Gaussian process model using the historical dataset and the high-frequency sensor signal predictions and predicting low-frequency sensor signal predictions.

20 Claims, 8 Drawing Sheets

(51) Int. Cl.
  *G16Y 40/35* (2020.01)
  *G16Y 30/00* (2020.01)
  *H04L 67/12* (2022.01)
  *G06N 7/00* (2006.01)

(58) Field of Classification Search
  USPC .............................. 709/217, 201, 219, 213
  See application file for complete search history.

(56) References Cited

U.S. PATENT DOCUMENTS

| | | |
|---|---|---|
| 2019/0025805 A1 | 1/2019 | Cella |
| 2020/0364583 A1* | 11/2020 | Pedersen .................. G06N 7/02 |
| 2021/0104335 A1* | 4/2021 | Han ........................ H04W 4/80 |
| 2021/0264278 A1* | 8/2021 | Liu ...................... G06N 3/0454 |
| 2021/0350181 A1* | 11/2021 | Navratil ................. G06N 20/00 |
| 2022/0076113 A1* | 3/2022 | Cao .......................... G06N 3/08 |
| 2022/0114401 A1* | 4/2022 | Cmielowski ........... G06N 20/00 |

OTHER PUBLICATIONS

Haque et al., "Sensor Anomaly Detection in Wireless Sensor Networks for Healthcare," Sensors, 2015, 15, pp. 8764-8786.

Horton et al., "Much Ado About Nothing: A Comparison of Missing Data Methods and Software to Fit Incomplete Data Regression Models," The American Statistician, Feb. 2007, vol. 61, No. 1, pp. 79-90.

Kireev et al., "Predictive repair and support of engineering systems based on distributed data processing model within an IoT concept," 2018 6th International Conference on Future Internet of Things and Cloud Workshops, Conference Paper, 2018, pp. 84-89.

Tata et al., "An Optimization Approach for Adaptive Monitoring in IoT Environments," 2017 IEEE 14th International Conference on Services Computing, 2017, pp. 378-385.

Zainuri et al., "A Comparison of Various Imputation Methods for Missing Values in Air Quality Data," Sains Malaysiana 44(3), 2015, pp. 449-456.

* cited by examiner

SENSOR SIGNAL PREDICTION AT UNREPORTED TIME PERIODS

BACKGROUND

The present disclosure relates to sensor signal processing, and more specifically, to predicting sensor signals unreported from a sensor transmitting signal readings at a certain time period.

The Internet of Things (IoT) is a term commonly used to refer to a system of interrelated computing devices, mechanical devices, digital devices, and sensors having the ability to transfer data over a network. IoT systems can be applied for consumer applications (e.g., smart home, elder care), organizational applications (e.g., healthcare, transportation, automation), and industrial applications (e.g., manufacturing, agriculture).

Predictive modeling is a process that uses data and statistics to predict outcomes with data models. It is a mathematical approach that uses an equation-based model to describe a phenomenon under consideration. The data model can be used to forecast an outcome to some future state or time based upon changes to the model inputs. Additionally, the model parameters can explain how model inputs influence the outcome.

SUMMARY

Embodiments of the present disclosure include a computer-implemented method for predicting unmonitored sensor signals using a prediction model. The computer-implemented method includes receiving a historical dataset of sensor signal data relating to an environment of a sensor monitoring system. The historical dataset includes a first sensor signal data, a second sensor signal data, and input variables relating to the sensor monitoring system. The computer-implemented method also includes generating sensor signal responses relating to the first sensor signal data by applying a Gaussian process regression model to the historical dataset and sensor parameters. The computer-implemented method further includes generating a hierarchical Gaussian process model that jointly considers multi-dimensional covariance structures among the input variables, the first sensor signal data, and the second sensor signal data, and predicting, by the hierarchical Gaussian process model, signal values relating to the second sensor signal data at time periods where the second sensor signal data was not monitored at using the sensor signal responses.

Additional embodiments of the present disclosure include a computer program product for predicting low-frequency sensor signal predictions using a prediction model which can include computer-readable storage medium having program instructions embodied therewith, the program instruction executable by a processor to cause the processor to perform a method. The method includes receiving a historical dataset of sensor signal data relating to an environment of a sensor monitoring system. The historical dataset includes a first sensor signal data, a second sensor signal data, and input variables relating to the sensor monitoring system. The method also includes generating sensor signal responses relating to the first sensor signal data by applying a Gaussian process regression model to the historical dataset and sensor parameters. The method further includes generating a hierarchical Gaussian process model that jointly considers multi-dimensional covariance structures among the input variables, the first sensor signal data, and the second sensor signal data, and predicting, by the hierarchical Gaussian process model, signal values relating to the second sensor signal data at time periods where the second sensor signal data was not monitored at using the sensor signal responses.

Further embodiments are directed to a system for predicting unmonitored sensor signal using a prediction model and configured to perform the method described above. The present summary is not intended to illustrate each aspect of every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

Figure 1:
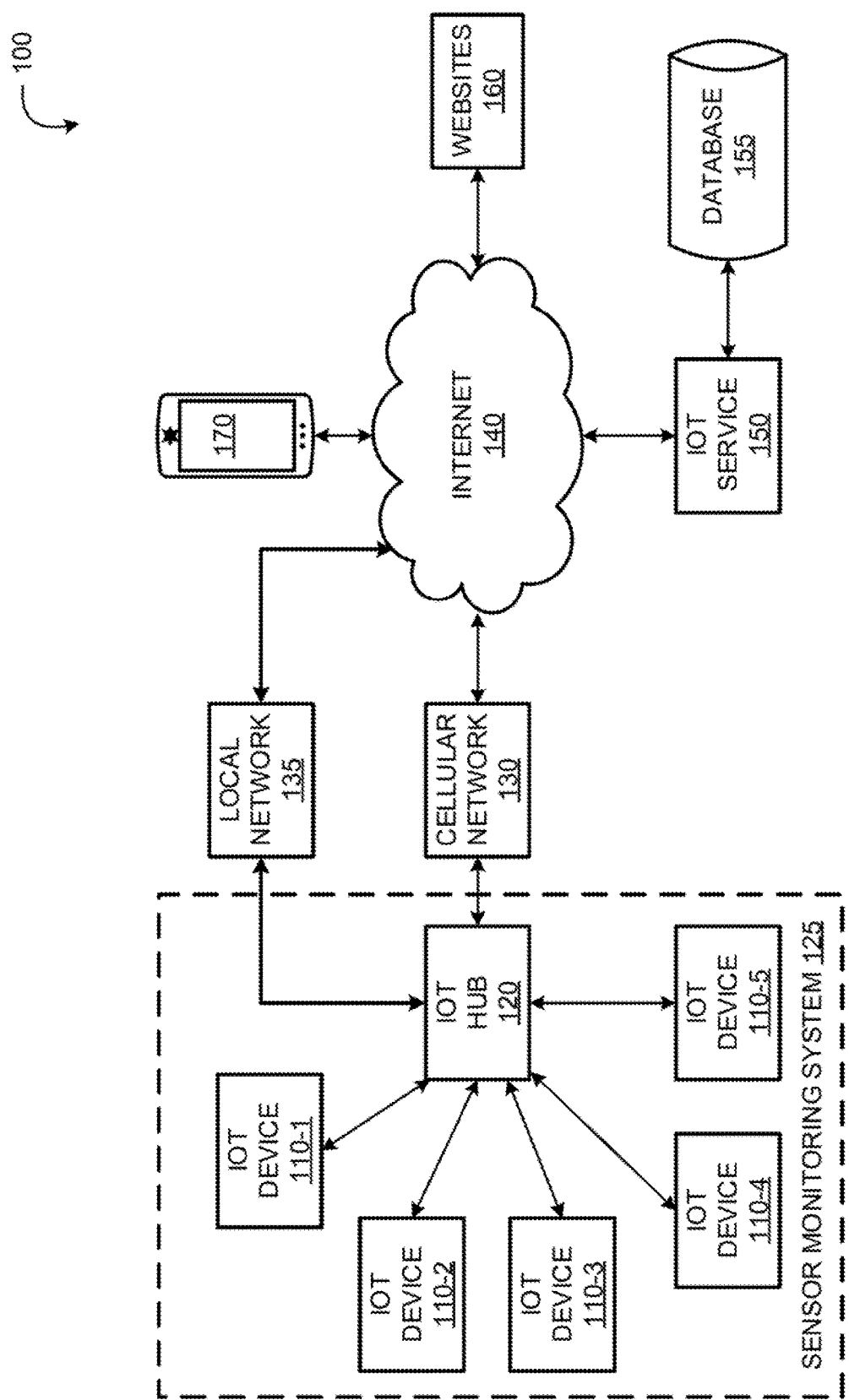
FIG. 1 is a block diagram illustrating an IoT system architecture, in accordance with embodiments of the present disclosure.

While the present disclosure is amenable to various modifications and alternative forms, specifics thereof have been shown by way of example, in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to sensor signal processing, and more specifically, to predicting sensor signals unreported from a sensor transmitting signal readings at a certain time period. While the present disclosure is not necessarily limited to such applications, various aspects of the disclosure may be appreciated through a discussion of various examples using this context.

Systems, such as IoT systems, can collect and analyze data gathered from sensors placed within the system. Sensor monitoring systems can use sensors in a wide array of applications. These applications include, for example, environmental sensing, condition monitoring, and process automation. Environmental sensing applications include sensors that monitor conditions such as air pollution, water pollution, production material pollution, and the like. Additionally, in hazardous environments, sensors can monitor natural disasters such as fire, flood, earthquakes, or landslides.

Process automation applications include sensor monitoring that provides users with information regarding resources in a production process, supply chain status, material creation anomalies, performance monitoring, process evaluation, as well improvements that can be implemented into a process.

Limitations in sensor monitoring systems remain, however, as current implementations are limited by technological challenges. The deployment and setup of a sensor monitoring system can be challenging. For instance, the environments where a sensor monitoring system is deployed to monitor environmental or production processes can be dynamic and can depend on the specific product, the phase of life of the product, or the kind of service provision considered. The type of product, or phase of life in a production process, can have different requirements imposing different constraints on a sensor monitoring system.

Additionally, a sensor monitoring system may limit the amount of information it gathers over a period of time for various reasons. These reasons include, for example, the importance of a particular reading, computing resource restraints, the expense of reporting a metric, storage capacity, and the like. As such, sensors can be set to report readings at a lower or higher frequency, depending on the information being gathered. As a result, some sensor data may be missing to accurately perform analytics on the information gathered by a sensor monitoring system.

From a mathematical perspective, missing data can be divided into three types. The first type is called missing completely at random (MCAR), where the missingness does not depend on the variable of interest, or any other variable, which is observed in the dataset. The second mechanism is missing at random (MAR), where there are observed values and missing input variables. The probability of missing data can be dependent on the observed input variables. The third mechanism is missing not at random (MNAR), which dictates that the missingness depends on both observed and missing variables.

IoT modeling and sensor data prediction using different time-frequency data can be considered as missing due to abnormal system operations (MCAR) and MNAR (missing due to limited computing resources, destructive, and expensive data collection process) mechanisms. A way to obtain an unbiased estimate of the parameters in an MNAR situation or MCAR situation is to model the missing data using predictive modeling. The model may then be incorporated into a more complex model for estimating missing values.

One approach to handling missing data is to use a data analysis method. An analysis method can be considered robust when there is little to no bias or distortion in the conclusions drawn on the population of data. However, this approach may not always be feasible. Alternatively, techniques such as data deletion and data imputation have also been used in missing data situations. Deletion techniques exclude cases with missing data and simply rely on complete data. This approach can remove a sizable portion of the collected data and can diminish the effectiveness of statistical analysis. Data imputation fill in predicted values at the locations of incomplete observations. Imputation can accomplish this by using a mean/median/last-observation value substitution, regression imputation, maximum likelihood method, multiple imputations, and the like. However, a major drawback of these methods is the lack of uncertainty quantification associated with the prediction.

Embodiments of the present disclosure may overcome the above and other problems by using a data prediction system to accurately predict low-frequency sensor data and to adjust sensor monitoring systems configurations. The data prediction system can implement a hierarchical Gaussian process model approach to impute missing values in high-dimensional sensor data. The hierarchical Gaussian process model can be non-parametric with a new multi-dimensional covariance structure among inputs and different time-frequency outputs that can impute missing data in sensor form.

More specifically, the data prediction system can generate a hierarchical prediction model by inputting controllable sensor parameters into a Gaussian process regression model and output sensor predictions for sensors that are monitored at a high-frequency. The sensor predictions being outputted by the Gaussian process regression model can be inputted into a hierarchical Gaussian Prediction model to output sensor predictions for sensors that are monitored at a low-frequency. Through the hierarchical modeling structure, the correlation between sensor parameters and high-frequency prediction data, the correlation between sensor parameters and low-frequency prediction data, and the correlation between high-frequency and low-frequency prediction data are all considered to make a predicted sensor data for the low-frequency monitored sensor data.

Embodiments of the present disclosure include a feedback control for changing sensor monitoring frequency in a sensor monitoring system. The collected sensor data in a sensor monitoring system may either be unnecessary because the monitoring frequency is too high, or it may be inadequate because the monitoring frequency is too low. The need to change monitoring frequency may be due to a change (e.g., environmental relocation, new materials, etc.) in a sensor monitoring system or because some sensor readings may change in importance, requiring a change in frequency readings. The data prediction system can include a feedback control based on a predetermined error threshold compared with predicted sensor data outputted by the data prediction system. Based on the comparison, the data prediction system can recommend sensor monitoring frequencies that can improve the reliability of the predicted data.

Embodiments of the present disclosure include a framework for updating the prediction model used by a sensor monitoring system based on a change in application. The data prediction system can generate a surrogate model for the sensor monitoring system. A multivariate Gaussian process surrogate can be trained using the monitored, historical, and prediction data for a current application. Additionally, an uncertainty metric can be quantified based on the new application in which the sensor monitoring system is being applied. Using the surrogate model, unspecified parameters of the new application can be connected while allowing for the model discrepancy and measurement errors.

By way of example, but not limitation, consider a sensor monitoring system configured as an IoT system monitoring the air quality of an indoor environment. The sensor monitoring system uses sensors to monitor the temperature, humidity, and particle dust with 6,000 readings for each sensor over a predetermined period (e.g., twelve hours, one day, one week). The frequency of the readings can be considered as high-frequency monitoring. Additionally, sensors also monitor carbon monoxide and sulfur dioxide with 500 readings for each sensor over the same predetermined period as the other sensors. The frequency of these sensors can be considered low-frequency monitoring. 80% of the readings from both the high-frequency data and low-frequency data can be used to build a hierarchical predictive model. The remaining 20% can be used to test the prediction error of the model.

Continuing with the example described immediately above, unspecified parameters, such as wind speed, wind direction, rainfall amount, and solar radiation, can be combined with the data readings of the high-frequency monitoring to train a surrogate model. Data points from an outdoor environment can be introduced to further train and adapt the surrogate model for use in an outdoor environment. The data prediction system, therefore, provides a framework for the sensor monitoring system to allow it to transition from an indoor environment to an outdoor environment while also being able to accurately predict low-frequency data.

Referring now to FIG. 1, shown is a high-level block diagram of an exemplary IoT platform 100 on which embodiments of the disclosure may be implemented. The IoT platform includes IoT devices 110-1, 110-2, 110-3, 110-4, 110-5 (collectively "IoT devices 110"), an IoT hub 120, a sensor monitoring system 125, a cellular network 130, a local network 135, the Internet 140, an IoT service 150, a website 160, and a user device 170. The IoT devices 110 are communicatively coupled over communication channels to the IoT hub 120. The IoT hub 120 is communicatively coupled to the IoT service 150 over the Internet 140.

The IoT devices 110 are components of the IoT platform configured with various types of sensors to collect information about themselves and their surroundings and provide the collected information to the IoT service 150, to websites 160, and/or the user device 170. For example, the IoT devices 110 can be sensors such as temperature sensors, accelerometers, heat sensors, motion detectors, and the like. In some embodiments, the IoT devices 110 perform a specified function in response to a control command sent through the IoT hub 120. As illustrated, the database 155 can store the data collected by the IoT devices 110. The data stored in the database 155 can then be made accessible to an end-user via a computing device accessing the websites 160 or through the user device 170.

The IoT hub 120 is a component of the IoT platform configured to maintain and direct the IoT devices 110. The IoT hub 120 can establish a connection to the Internet 140 via a cellular network 130 such as a 4G (e.g., Mobile WiMAX, LTE) or 5G cellular data service. Additionally, or alternatively, the IoT hub 120 can establish a connection to the Internet 140 using the local network 135 which can establish a Wi-Fi connection through a Wi-Fi access point or router which couples the IoT hub 120 to the Internet 140 (e.g., via an Internet Service Provider providing Internet service to an end-user operating the IoT hub 120).

In some embodiments, the IoT platform 100 includes an IoT application or Web application executable on the user device 170 to allow users to access and configure the IoT devices 110 (e.g., change monitoring frequency of a sensor), the IoT hub 120, and/or the IoT service 150.

As illustrated, the sensor monitoring system 125 represents a collection of IoT devices 110 connected to the IoT hub 120 installed in a single environment (e.g., a home, business, warehouse) It should be noted, any number of IoT hubs 120 and IoT devices 110 can be installed in an environment to comprise the sensor monitoring system 125. Depending on the application in which the sensor monitoring system 125 is deployed for, additional or fewer IoT hubs 120 and IoT devices 110 may be installed and used.

It is noted that FIG. 1 is intended to depict the representative major components of an exemplary IoT platform 100.

In some embodiments, however, individual components may have greater or lesser complexity than as represented in FIG. 1, components other than or in addition to as shown in FIG. 1 may be present, and the number, type, and configuration of such components may vary.

Figure 2:
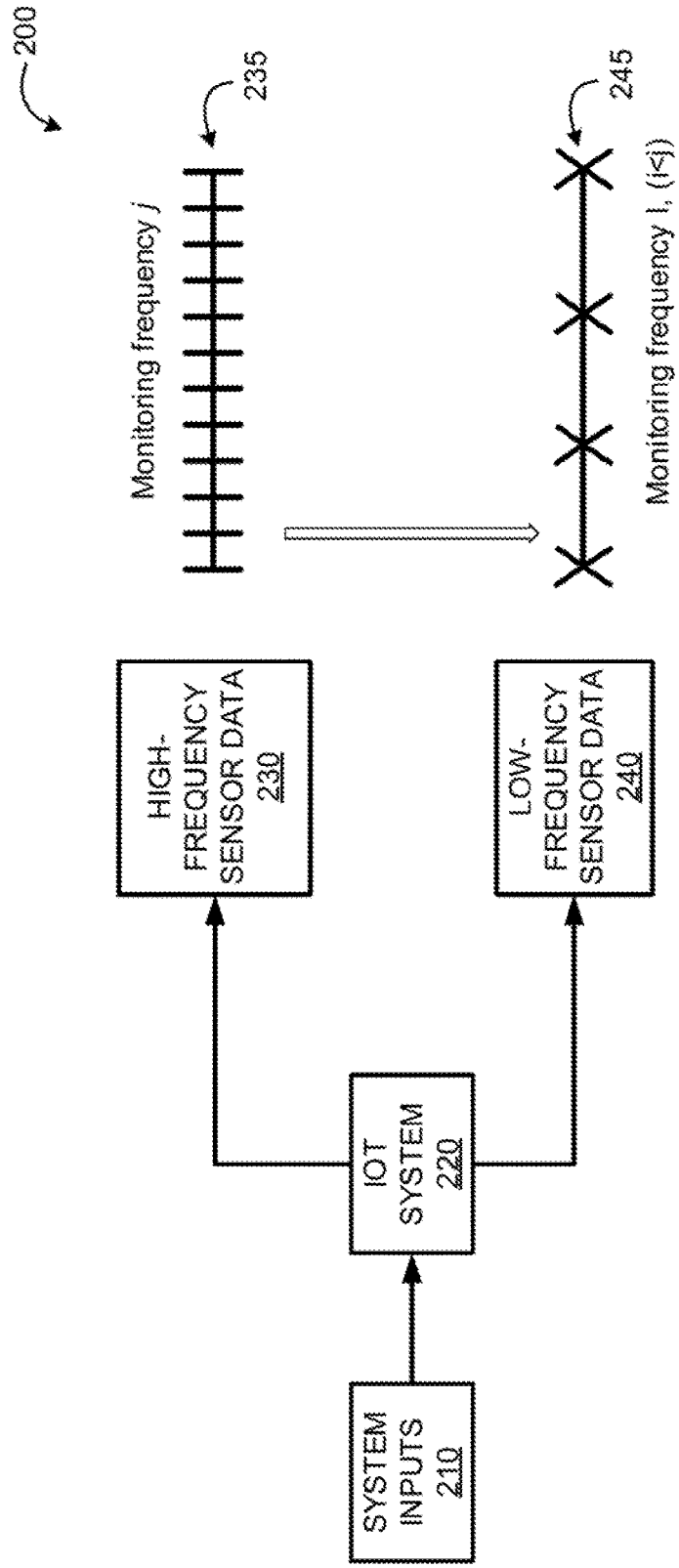
FIG. 2 is a block diagram illustrating a IoT system architecture with two signal monitoring frequencies, in accordance with embodiments of the present disclosure.

FIG. 2 is a high-level block diagram of an exemplary IoT system architecture 200. The exemplary IoT system architecture 200 illustrates sensor information considered quantities of interest. Embodiments of the present disclosure can utilize these quantities of interest to predict missing data. The IoT system architecture system inputs 210, an IoT system 220 (which can be the same as, or substantially similar to, IoT platform 100 of FIG. 1), high-frequency sensor data 230, monitoring frequency 235, low-frequency sensor data 240, and monitoring frequency 245.

Initially, the system inputs 210 provide information to the IoT system 220. The system inputs 210 include information provided to the IoT system 220 that allow the system 220 to operate within an environment such as sensor settings, configurations, placement, and the like.

The exemplary IoT system 220 outputs high-frequency sensor data 230 and low-frequency sensor data 240 using the system inputs 210 and sensors reporting to the IoT system 220. In some circumstance, restrictions may exist preventing the IoT system 200 to receive and/or monitor the low-frequency sensor data 240 at a higher frequency.

Embodiments of the present disclosure can use the correlation between the monitoring frequency 235 of the high-frequency sensor data 230 with the monitoring frequency 245 of the low-frequency sensor data to impute missing values in the low-frequency sensor data 240. These missing values may provide useful insights in the operation of the IoT system 220.

Figure 3:
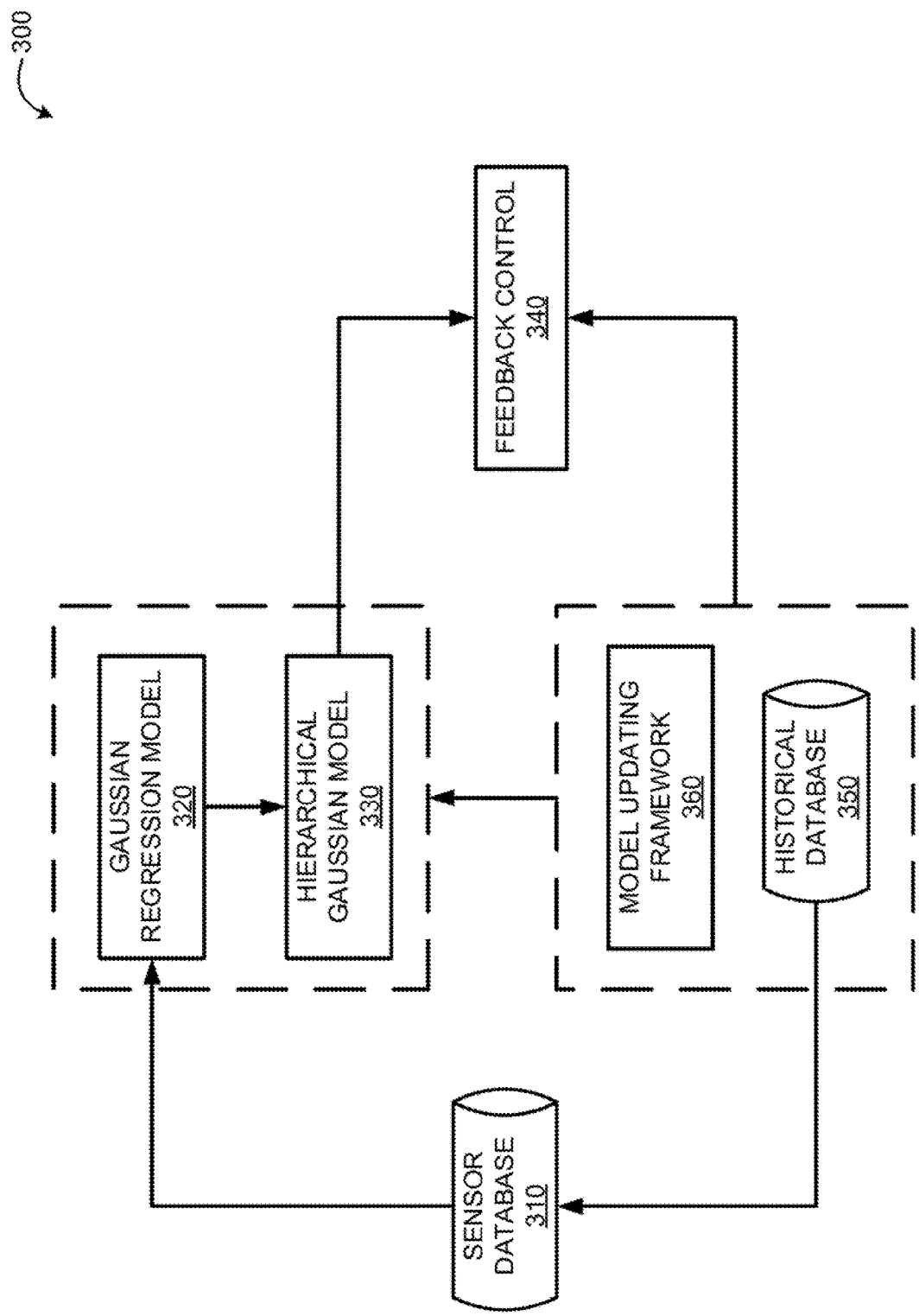
FIG. 3 is a block diagram illustrating a data prediction system, in accordance with embodiments of the present disclosure.

FIG. 3 is a block diagram illustrating a data prediction system 300 for predicting low-frequency sensor signals, in accordance with embodiments of the present disclosure. The data prediction system 300 includes a sensor database 310, a Gaussian process regression model 320, a hierarchical Gaussian process model 330, a feedback control 340, a historical database 350, and a model updating framework 360.

The sensor database 310 is a database in the data prediction system 300 configured to store configured to store a historical dataset of sensor signal data from sensors in a sensor monitoring system. The sensor signal data can include sensor signal data collected from sensors reporting at different time frequencies. For example, a sensor signal data may be collected at a low-frequency (e.g., ten minutes, one hour, one day) while another sensor signal data may be collected at a high time-frequency (e.g., every second, thirty seconds, every minute). It should be noted that low-frequency sensor signal data and high-frequency sensor signal data can be relative to each other. High-frequency sensor signal data need only be collected more often than low-frequency sensor signal data. It should be noted that while the disclosure discusses an evaluation of sensor signals at higher and lower frequencies, embodiments of the present disclosure can also use sensor signals at various time-frequencies. For example, the sensor signal data can include sensor signals of the same frequency but at different reporting times. While shown in FIG. 3 as a database, the sensor database 310 can be a mapping, a table, journal, metadata, and the like.

In some embodiments, the sensor database 310 stored the historical dataset of sensor signal data remotely. For example, the sensor database 310 can be the same as, or substantially similar to, database 155 of FIG. 1. The sensor database 310 can be accessed by the data prediction system 300 over the Internet via a computing device.

The Gaussian process regression model 320 is a component of the data prediction system 300 configured to predict high-frequency sensor signal data. The Gaussian process regression model 320 can model a high-frequency prediction variable as a noise Gaussian process regression model, as illustrated by Equation 1 described below:

$$y_i^H \sim \mathcal{GP}(f(x_i), \sigma_1^2) \qquad \text{Equation 1}$$

where $y_i^H$ represents a high-frequency prediction variable as a noise version Gaussian process regression model of the latent function value $f(x_i)$. The distribution of noise can be Gaussian $N(0,\sigma_1^2)$ with zero mean and variance 61. The model can be additionally defined by Equation 2 described below:

$$f(x) \sim \mathcal{GP}(\mu, K) \qquad \text{Equation 2}$$

where a zero mean ($\mu=0$) and a kernel function K (which is the covariance matrix over observations with a hyper-parameter $\theta$) as a covariance matrix.

From the above definitions, the Gaussian process regression model 320 can get a joint probability of the prediction variables and latent function variable $p(y^H, f) = p(y^H|f)p(f)$. The distribution of the latent function value $f$ is a Gaussian distribution with mean and covariance illustrated by Equation 3 and 4 described below:

$$\text{mean}(f(x^*)|x, y^H) = k_X(\sigma_1^2 I + K_{xx})^{-1} y^H \qquad \text{Equation 3}$$

$$\text{Cov}(f(x^*)|x, y^H) = k_{x^*x^*} - k_{x^*X}(\sigma_1^2 I + K_{xx})^{-1} k_{Xx^*} \qquad \text{Equation 4}$$

where $k_{x^*X} = k(x^*, X)$ is an n-dimensional row vector of the covariance between $x^*$ and N training samples, $K_{xx} = k(X, X)$ denotes the kernel function of the N training samples $(y^H, X)$, which can be used to estimate the covariance function. The related predictive distribution of $y^{H*}$ can also be Gaussian with the mean defined by $\text{mean}(f(x^*)|x, y^H)$ and covariance defined by $\text{Cov}(f(x^*)|x, y^H) + \sigma_1^2 I$.

The Gaussian process regression model 320 can also factor in hyperparameters for prediction. The hyperparameters can be controllable sensor parameters included in the historical dataset that is stored in the sensor database 310. Using the definitions described above, the hyperparameters can be indicated using $\theta$. In a non-Bayesian analysis, the mean $E(f(x^*)|D)$, can be evaluated at the maximum likelihood estimation (MLE) of $\theta$ by taking the log-likelihood function, which can be used as a prediction for $y^{H*}$. In a Bayesian approach, prior information about the hyperparameter can be summarized in the form of a prior density indicated by $p(\theta)$. The posterior density for $\theta$ given a training dataset Q can be defined as $p(\theta|Q) \sim p(\theta)p(y|X,\theta)$; where $p(y|X,\theta)$ is the density function of an N-dimensional multivariate normal distribution with zero mean and covariance matrix $(\sigma^2 I + K_{xx})$.

The hierarchical Gaussian process model 330 is a component of the data prediction system 300 configured to predict sensor data at a high-frequency given the outputted predicted high-frequency sensor signal data produced by the Gaussian process regression model 320. The hierarchical Gaussian process model 330 can leverage the relationship between high-frequency sensor signal data and low-frequency sensor signal data using the input received by the Gaussian process regression model 320 as illustrated by equations 5 and 6 described below:

$$y_i^L \sim \mathcal{GP}(f(y_i^H), \sigma_2^2) \qquad \text{Equation 5}$$

$$f(y_i^H) \sim \mathcal{GP}(\mu, C) \qquad \text{Equation 6}$$

where $y^H$ represents high-frequency sensor signal data, $y^L$ represents low-frequency sensor signal data, $y_i^H$ represents input received from the Gaussian process regression model 320. Additionally, $y^L$ can represent a continuous longitudinal variable that follows a Gaussian distribution in equation 5, where $f(y_i^H)$ follows the Gaussian process distribution with the mean $\mu$ is assumed as zero (which is separate from the mean of the predicted $y^H$). The covariance $C = \text{Cov}(y^H, y^L)$ can be estimated using a Markov Chain Monte Carlo approach (MCMC). The low-frequency sensor signal data can then be predicted using Equation 7 described below:

$$E(y^{L*}|D) = c_y H^*_y H^*(\sigma_2^2 + C)^{-1} y^L \qquad \text{Equation 7}$$

where $C_y H^*_y H^* = \text{Cov}(f(x^*)|x, y^H) + \sigma_1^2 I$ can be calculated as described above, and $C = \text{Cov}(y^H, y^L)$ can be estimated by MCMC.

The feedback control 340 is a component of the data prediction system 300 configured to provide frequency feedback for the sensors in a sensor monitoring system. Default frequency settings for sensors may not accurately monitor an environment. High-frequency sensor signal data may ultimately be meaningless and considered redundant. While some sensor signal data may be inadequately monitored. The feedback control 340 can provide feedback for sensor frequency by performing cross-validation of the high-frequency sensor signal data with the low-frequency sensor signal data to calculate prediction errors.

The feedback control 340 is further configured to plot the prediction errors for the different sensor parameters of the given sensors. For any sensor signal, the area where the absolute percentage error of one sensor signal is larger than a user-defined threshold can trigger the need for that particular sensor to be monitored at a higher frequency. Otherwise, the monitoring frequency for that sensor can be lowered.

In some embodiments, the feedback control 340 operates as an automatic control loop that dynamically changes the sensor monitoring frequencies of sensors in a sensor monitoring system. The feedback control 340 can continuously receive low-frequency sensor signal data predictions from the hierarchical Gaussian process model 330 and validates the data by plotting the prediction errors and determining whether a reading exceeds the pre-defined user threshold. The control loop can continue until the prediction errors reach a pre-defined acceptable level.

The historical database 350 is a database in the data prediction system 300 configured to store a historical dataset of sensor signal data from sensors in a sensor monitoring system used in a different application. For example, the sensor database 310 can store sensor signal data of a sensor monitoring system installed in an indoor environment, and the historical database 350 can store sensor signal data of the sensor monitoring system installed in an outdoor environment. The sensor signal data can include sensor signal data collected from sensors reporting at different time frequencies. For example, a sensor signal data may be collected at a low-frequency (e.g., ten minutes, one hour, one day) while another sensor signal data may be collected at a high time-frequency (e.g., every second, thirty seconds, every minute). It should be noted that low-frequency sensor signal data and high-frequency sensor signal data can be relative to each other. High-frequency sensor signal data need only be collected more often than low-frequency sensor signal data. While shown in FIG. 3 as a database, the historical database 350 can be a mapping, a table, journal, metadata, and the like.

In some embodiments, the historical database 350 stores the historical dataset of sensor signal data remotely. For example, the historical database 350 can be the same as, or substantially similar to, database 155 of FIG. 1. The historical database 350 can be accessed by the data prediction system 300 over the Internet via a computing device.

The model updating framework 360 is a component of the data prediction system 300 configured to update a prediction model of a sensor monitoring system applied to different applications. The model updating framework 360 is configured to generate a surrogate prediction model for a sensor monitoring system that is already modeled by the data prediction system 300. The surrogate prediction model can be generated by training a multivariate Gaussian process surrogate model using the sensor data stored in the sensor database 310 and the sensor data stored in the historical database 350. Additionally, controllable sensor input parameters can also be inputted.

Unspecified parameters relating to a specific application can be adjusted to adapt the sensors to different system applications. For example, a sensor is monitoring the formation of a material using a specific type of metal (e.g., iron) can be considered one type of application. Another application can be the same sensor monitoring the formation of the material using a different type of metal (e.g., cobalt). The unspecified parameters can be used to capture the variance between applications so as to allow the sensor to accurately monitor the environment.

The model updating framework 360 is further configured to quantify an uncertainty of changing the application of a sensor monitoring system. The model updating framework 360 can connect the unspecified parameters to the monitored sensor data under a different application and use the surrogate prediction model. In some embodiments, the model updating framework 360 quantifies an uncertainty of changing the application of a sensor monitoring system using equation 8 as described below:

$$Z(x)=\hat{Y}(x,\theta)+\delta(x)+\varepsilon \qquad \text{Equation 8}$$

where x represents input parameters for the controllable sensor settings, θ here represents the unspecified parameters adjustable to adapt a sensor to different applications, Z represents a different application using the built surrogate model ($\hat{Y}(x,\theta)$) of sensor signal data. The model discrepancy can be represented by (δ(x)) with measurement errors (ε).

Continuing with equation 8, prior probabilities for all unknown parameters represented by Ø, the unspecified parameters θ, and hyper-parameters (e.g., the covariance of the discrepancy function Σδ can be decided on. Additionally, the model updating framework 360 can assign a function that gets Ø as input and computes the prior probability for that high-dimensional variable space. The model updating framework 360 can also compute a function that gets Ø and the monitored sensor parameters to compute a posterior probability for maximizing log-likelihood and MCMC sampling. Using a single component Metropolis-Hastings sampling, the model updating framework 360 can find posteriors for each unknown parameter. The unspecified parameters can then be specified using the posterior distributions.

In some embodiments, the model updating framework 360 uses a Kriging technique to make final predictions. Using the unspecified parameters specified by posterior distributions, the Kriging technique can be to generate final predictions as represented by equation 9 described below:

$$Y^P=E[Y^P|Y^E]=\mu(X^P)+\text{Cov}^{PE}(\text{Cov}^{EE})^{-1}(Y^E-\mu(X^E)) \qquad \text{Equation 9}$$

where $Y^P$ represents the final predicted outputs for new inputs $X^P$. For computing the outputs $Y^P$, the model updating framework 360 can use the monitored sensor parameters $X^Z$ in addition to running a simulation of the prediction model with the unspecified parameters specified as posterior distributions.

It is noted that FIG. 3 is intended to depict the representative major components of an exemplary data prediction system 300. In some embodiments, however, individual components may have greater or lesser complexity than as represented in FIG. 3, components other than or in addition to as shown in FIG. 3 may be present, and the number, type, and configuration of such components may vary.

Figure 4:
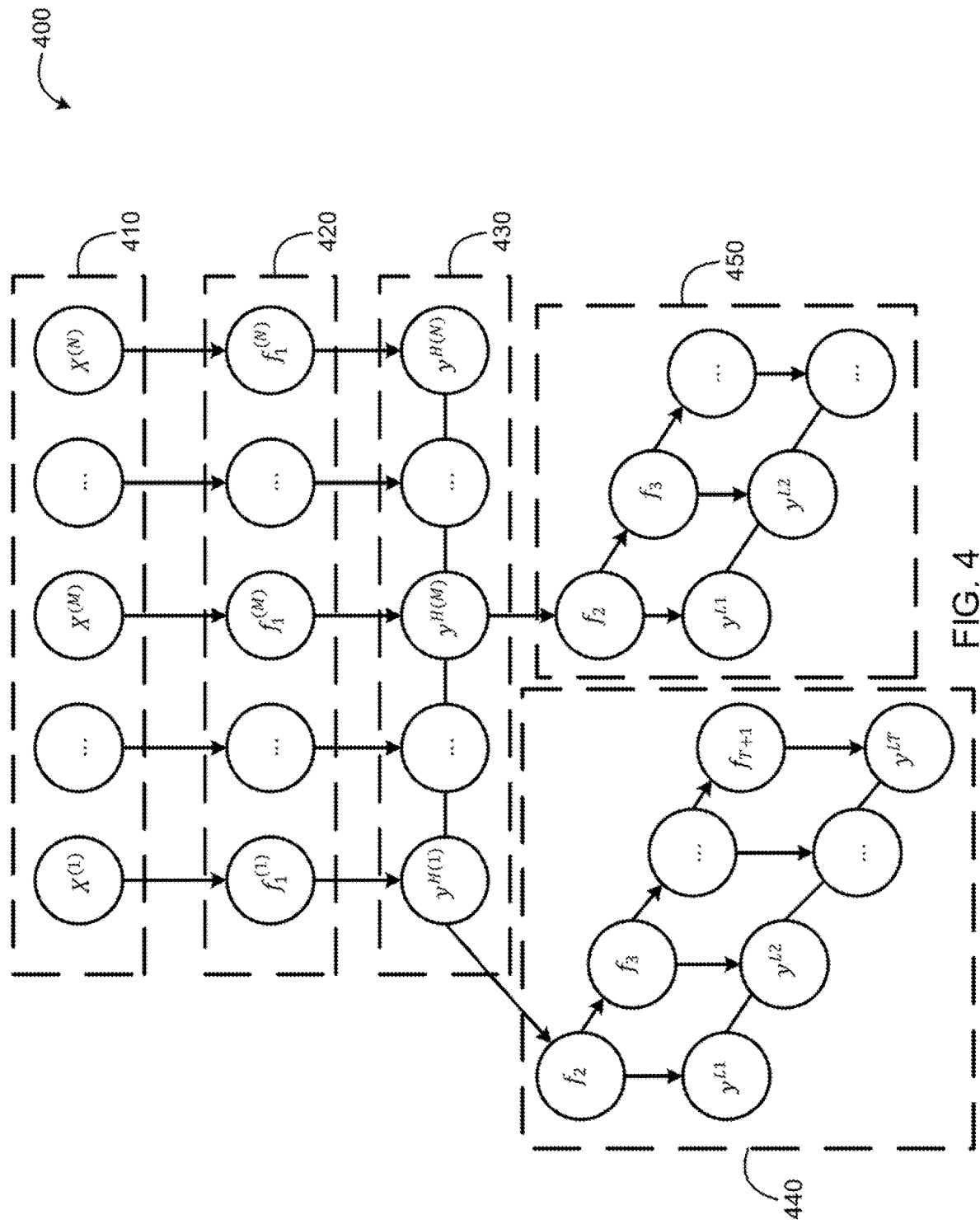
FIG. 4 is a hierarchical data structure of sensor signal data, in accordance with embodiments of the present disclosure.

FIG. 4 is an exemplary hierarchical structure 400 of sensor signal data in descending order, in accordance with embodiments of the present disclosure. The hierarchical structure 400 illustrates a multi-dimensional hierarchical covariance structure among input variables, high-frequency outputs, and low-frequency outputs in a hierarchical way. Its posterior prediction is to impute missing sensor data in a sensor monitoring system.

Inputs 410 represent new inputs X* into the data prediction system 400. The data prediction system 400 can hierarchically predict the low to high-frequency response of the new inputs 410. To do so, the data prediction system 400 generates the hierarchical structure 400 by computing two output levels 420, 430. The first level 420 is a covariance among the inputs 410 and the highest frequency sensor signal data output.

The second level 430 represents the covariance of the highest time-frequency sensor signal data and the second-highest time-frequency sensor signal data. A correlation between the two outputs can be modeled 440, 450, with the amount of data in the low-frequency sensor data. The models 440, 450 can keep adding the covariance levels until the last two lowest time-frequency outputs.

Figure 5:
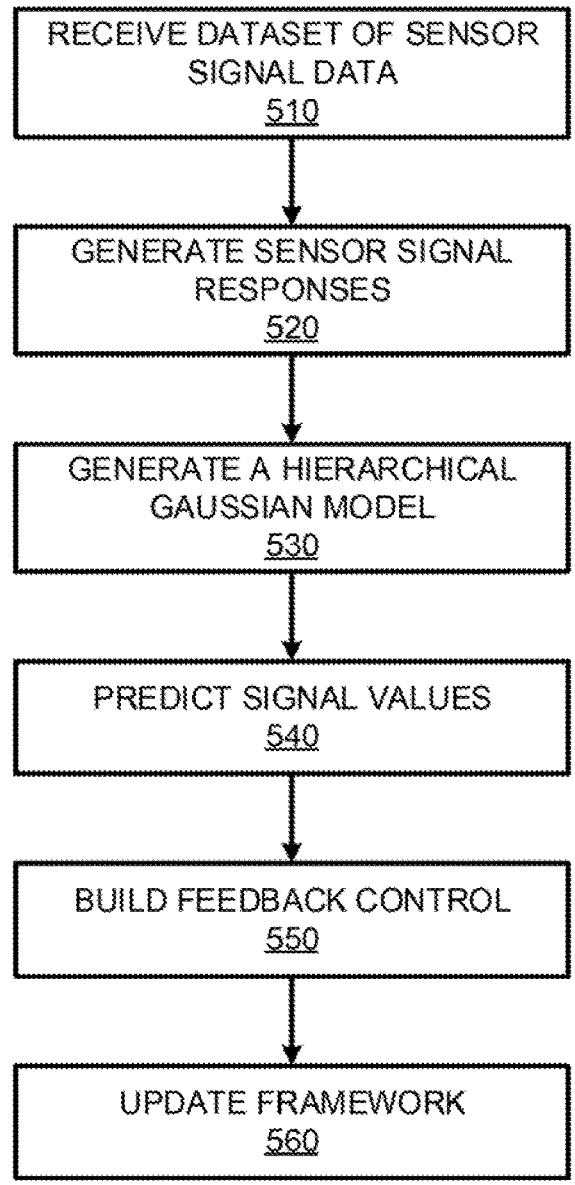
FIG. 5 is a flow diagram illustrating a process of predicting low-frequency sensor signal data, in accordance with embodiments of the present disclosure.

FIG. 5 is a flow diagram illustrating a process 500 of predicting low-frequency sensor signal data. The process 500 begins by receiving a historical dataset of sensor signal data of a sensor monitoring system. The historical dataset includes a firsts sensor signal data, a second sensor signal data, and input variables relating to an environment of the sensor monitoring system. For example, the environment can be a sensor monitoring system monitoring environmental conditions in an indoor environment. Another environment can be the same sensor monitoring system monitoring environmental conditions in an outdoor environment. In some embodiments, the first sensor signal data includes readings at a higher rate than the second sensor signal data. For example, the first sensor signal data can include sensor reading every fifteen seconds while the second sensor signal data can include sensor readings every minute. The signal data in the historical dataset can correspond to sensors positioned within the sensor monitoring system.

In some embodiments, the historical dataset is received remotely from a sensor database 310 collecting and storing sensor data of the sensor monitoring system. For example, the sensor monitoring system can be an IoT system that collects and stores sensor data over a network where the sensor database 310 is accessible via a computing device.

Sensor signal responses are generated using a Gaussian regression process through the use of a Gaussian regression model 320. This is illustrated at step 520. The Gaussian process regression model 320 takes as input, the input variables from the historical dataset. The input variables can be sensor parameters of the sensors used in the sensor monitoring system. Additionally, the first sensor signal data is also inputted into the Gaussian process regression model. The input variables can also include pre-defined sensor parameters that are set based on an environment. These pre-defined parameters can assist the sensors in accurately reporting readings. The parameters can also vary based on the sensor type, as well as the environment in which the sensor is installed.

The Gaussian process regression model 320 can model a high-frequency sensor signal prediction as a noise-version of a latent function value using the sensor parameters and the first sensor signal data. In some embodiments, the latent function value is defined by equation 1, defined above, where the distribution of noise is Gaussian represented by a zero mean and variance. Once modeled, the Gaussian process regression model 320 outputs the sensor signal responses.

A hierarchical Gaussian process model 330 is generated using a hierarchical Gaussian regression process. This is illustrated at step 530. The hierarchical Gaussian process model 330 can be fitted to the first sensor signal data and the second sensor signal data located in the historical dataset in order to leverage their correlated relationship while using the sensor signal responses produced by the Gaussian process regression model 320.

The hierarchical Gaussian process model is non-parametric with a new multi-dimensional covariance structure among inputs and different time frequency outputs which offers a greater level of flexibility to impute missing data in the sensor form. To portray the inherent hierarchical structure, the signal data is sorted in descending order based on their monitoring frequencies. Additionally, the hierarchical Gaussian process model considers the multi-dimensional covariance in different levels.

The covariance among the first sensor signal data and the second signal data represents the first level. The first level covariance can have the highest influence on IoT missing data imputation, as these historical data tend to include the fullest information of the dependent inputs and outputs.

The covariance of the highest time frequency output and the second highest time frequency output is in the second level. The correlation between two outputs with the amount of data in the lower time frequency data can then be modeled. Additional levels are applied until the last two lowest time frequency outputs are reached.

In some embodiments, the hierarchical Gaussian process model predicts sensor signal data relating to the second sensor signal data based on a correlation between the first sensor signal data and the second sensor signal data. Additionally, the hierarchical Gaussian process model jointly considers multi-dimensional covariance structures among the input variables, the first sensor signal data, and the second sensor signal data. A posterior prediction of the hierarchical Gaussian process model can also impute missing sensor data in the sensor monitoring system.

The hierarchical Gaussian process model 330 can model sensor signal values as a noise-version of the sensor signal responses. In some embodiments, the latent function value is defined by equation 1, defined above, where the distribution of noise is Gaussian represented by a zero mean and variance.

The hierarchical Gaussian process model 330 predicts sensor signal values. This is illustrated at step 540. In some embodiments, the hierarchical Gaussian process model 330 predicts the sensor signal values using equation 7 defined above. The predictions can represent low-frequency sensor signals that are missing from the historical dataset and are determined based on the correlation between the high-frequency sensor signals and the low-frequency sensor signals.

The data prediction system 300 builds a feedback control 340 providing the sensor monitoring system with adjustments. This is illustrated at step 550. The feedback control 340 can perform a cross-validation of the sensor signal responses with the signal values to determine a prediction error that provides a feedback control to the sensor monitoring system. The sensors parameters can be the same sensor parameters used in making the sensor signal predictions or from all sensor parameters of sensors in the sensor monitoring system.

The feedback control 340 can plot the prediction errors with all sensor parameters provided by the sensor monitoring system and determine the prediction errors exceeding a predetermined threshold. For example, if the prediction error exceed five percent then those predictions are selected as needing adjustment.

The feedback control 340 can adjust a reporting frequency for the sensors based on the prediction error. The adjustment can be to adjust a sensor to a lower frequency level or to a high-frequency level depending on the prediction error produced by the cross-validation. The feedback control 340 can continue to perform this process in a loop until the prediction error is within the predetermined threshold set by a user.

The model updating framework 360 updates the framework of the data prediction system 300 to provide a framework for transitioning the sensor monitoring system to a different environment This is illustrated at step 560. The model updating framework 360 generates a surrogate prediction model for the sensor monitoring system. The surrogate prediction model can include a Gaussian process regression model and a hierarchical Gaussian process model configured to the different environment.

The model updating framework 360 can train the surrogate prediction model using the historical dataset and a second historical dataset. The second historical dataset can be stored in the historical database 350 and includes other first sensor signal data and other second sensor signal data for the sensor monitoring system relating to the different environment.

The model updating framework 360 also quantifies an uncertainty relating to the sensor monitoring system applied in the second application. The uncertainty can be quantified using the surrogate prediction model and unspecified parameters of the sensors in the sensor monitoring system. Based on the uncertainty, the model updating framework 360 can compute an update to the hierarchical Gaussian process model and the Gaussian process regression model applied to the second application. This allows the data prediction system 300 to accurately make signal values for the sensor monitoring system in the different environment.

Figure 6:
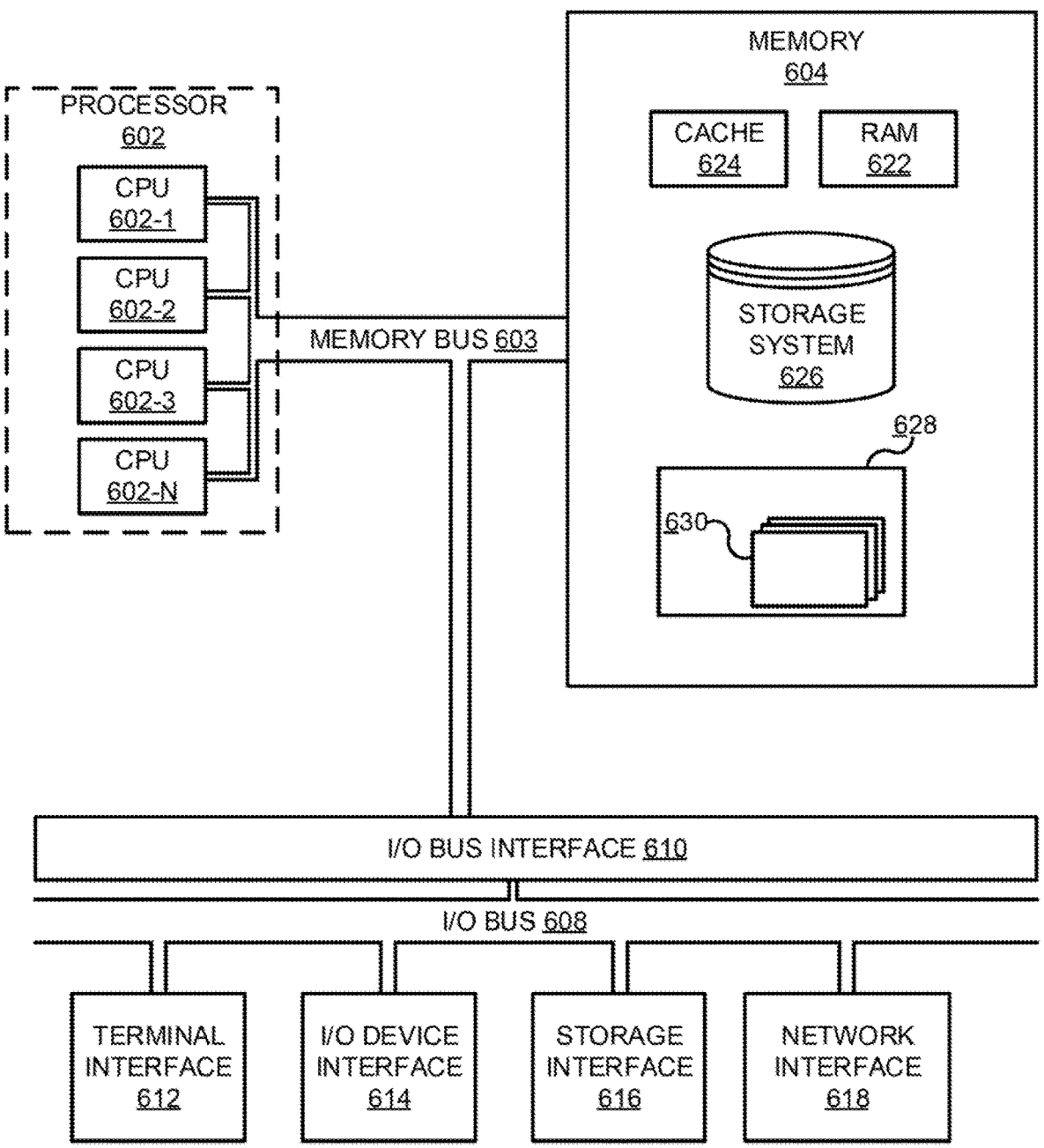
FIG. 6 is a high-level block diagram illustrating an example computer system that may be used in implementing one or more of the methods, tools, and modules, and any related functions, described herein, in accordance with embodiments of the present disclosure.

Referring now to FIG. 6, shown is a high-level block diagram of an example computer system 600 (e.g., the data prediction system 300) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 600 may comprise one or more processors 602, a memory 604, a terminal interface 612, an I/O (Input/Output) device interface 614, a storage interface 616, and a network interface 618, all of which may be communicatively coupled, directly or indirectly, for inter-component communication via a memory bus 603, an I/O bus 608, and an I/O bus interface 610.

The computer system 600 may contain one or more general-purpose programmable central processing units (CPUs) 602-1, 602-2, 602-3, and 602-N, herein generically referred to as the processor 602. In some embodiments, the computer system 600 may contain multiple processors typical of a relatively large system; however, in other embodiments, the computer system 600 may alternatively be a single CPU system. Each processor 601 may execute instructions stored in the memory 604 and may include one or more levels of on-board cache.

The memory 604 may include computer system readable media in the form of volatile memory, such as random-access memory (RAM) 622 or cache memory 624. Computer system 600 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

Although the memory bus 603 is shown in FIG. 6 as a single bus structure providing a direct communication path among the processors 602, the memory 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 600 may, in some embodiments, contain multiple I/O bus interface units, multiple I/O buses, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 600 may be a multi-user mainframe computer system, a single-user system, or a server computer or similar device that has little or no direct user interface but receives requests from other computer systems (clients). Further, in some embodiments, the computer system 600 may be implemented as a desktop computer, portable computer, laptop or notebook computer, tablet computer, pocket computer, telephone, smartphone, network switches or routers, or any other appropriate type of electronic device.

It is noted that FIG. 6 is intended to depict the major representative components of an exemplary computer system 600. In some embodiments, however, individual components may have greater or lesser complexity than as represented in FIG. 6, components other than or in addition to those shown in FIG. 6 may be present, and the number, type, and configuration of such components may vary.

One or more programs/utilities 628, each having at least one set of program modules 630 (e.g., the data prediction system 300), may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

It is to be understood that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and P.D.A.s).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 7:
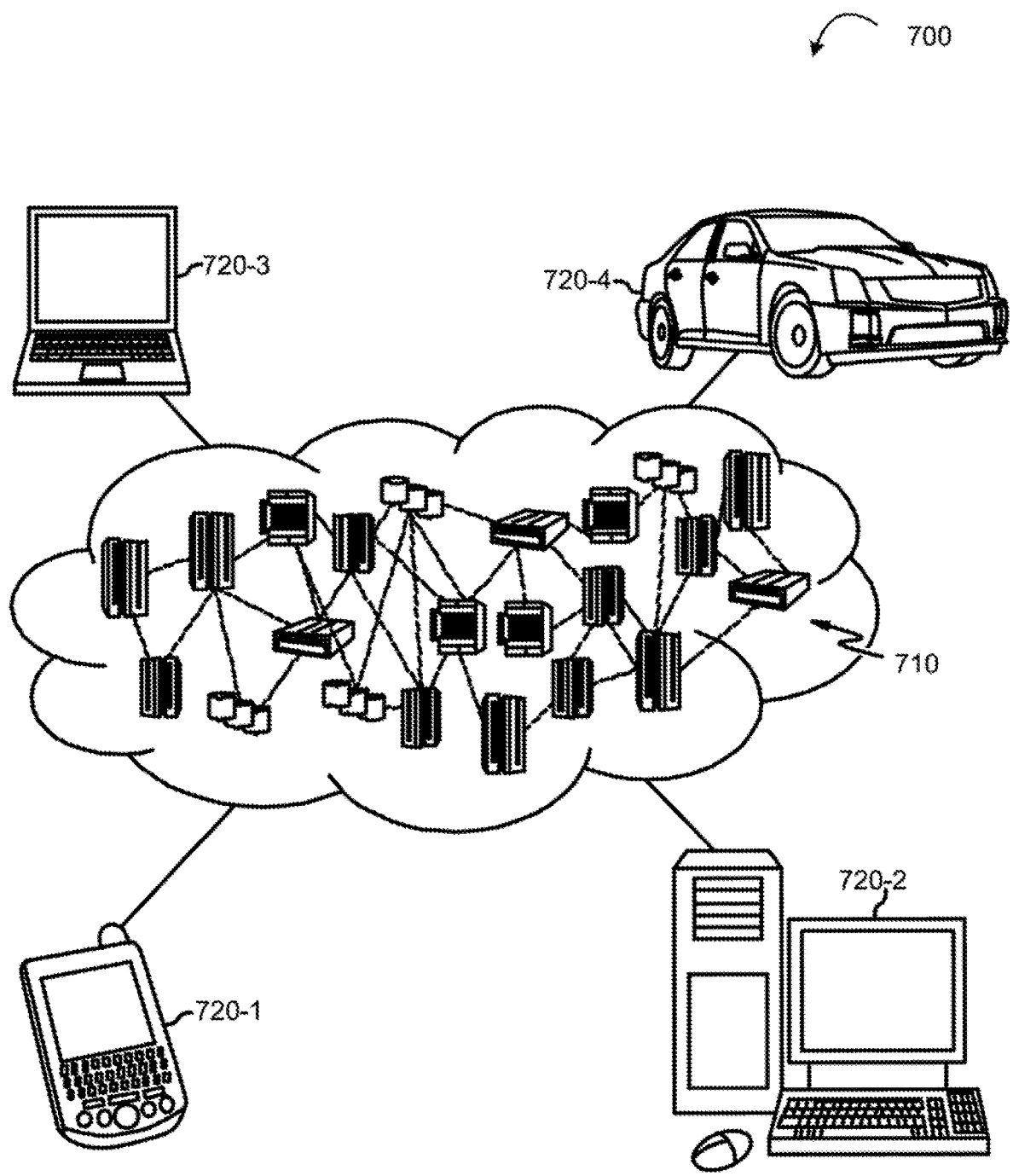
FIG. 7 depicts a cloud computing environment, in accordance with embodiments of the present disclosure.

Referring now to FIG. 7, illustrative cloud computing environment 700 is depicted. As shown, cloud computing environment 700 includes one or more cloud computing nodes 710 with which local computing devices used by cloud consumers, such as, for example, personal digital assistant (P.D.A.) or cellular telephone 720-1, desktop computer 720-2, laptop computer 720-3, and/or automobile computer system 720-4 may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 720-1 to 720-4 shown in FIG. 7 are intended to be illustrative only and that computing nodes 710 and cloud computing environment 700 can communicate with any type of computerized device over any type of network and/or network addressable connection (e.g., using a web browser).

Figure 8:
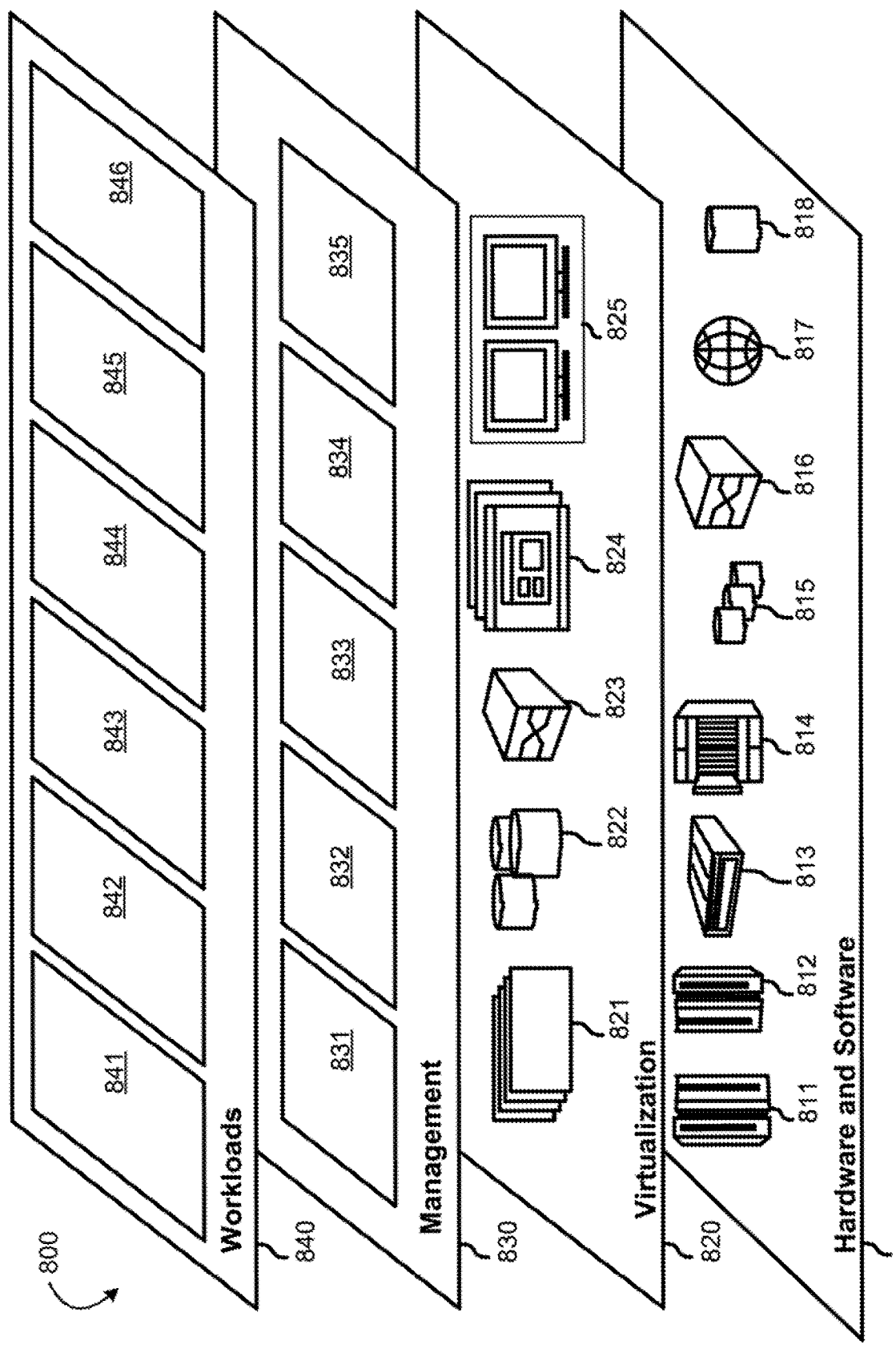
FIG. 8 depicts abstraction model layers, in accordance with embodiments of the present disclosure.

Referring now to FIG. 8, a set of functional abstraction layers 800 provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 810 includes hardware and software components. Examples of hardware components include mainframes 811; RISC (Reduced Instruction Set Computer) architecture-based servers 812; servers 813; blade servers 814; storage devices 815; and networks and networking components 816. In some embodiments, software components include network application server software 817 and database software 818.

Virtualization layer 820 provides an abstraction layer from which the following examples of virtual entities may be provided: virtual servers 821; virtual storage 822; virtual networks 823, including virtual private networks; virtual applications and operating systems 824; and virtual clients 825.

In one example, management layer 830 may provide the functions described below. Resource provisioning 831 provides dynamic procurement of computing resources and other resources that are utilized to perform tasks within the cloud computing environment. Metering and Pricing 832 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 833 provides access to the cloud computing environment for consumers and system administrators. Service level management 834 provides cloud computing resource allocation and management such that required service levels are met. Service Level Agreement (S.L.A.) planning and fulfillment 835 provide pre-arrangement for, and procurement of, cloud computing resources for which a future requirement is anticipated in accordance with an S.L.A.

Workloads layer 840 provides examples of functionality for which the cloud computing environment may be utilized. Examples of workloads and functions which may be provided from this layer include mapping and navigation 841; software development and lifecycle management 842 (e.g., the data prediction system 300); virtual classroom education delivery 843; data analytics processing 844; transaction processing 845; and precision cohort analytics 846.

The present invention may be a system, a method, and/or a computer program product at any possible technical detail level of integration. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (R.O.M.), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (I.S.A.) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (P.L.A.) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method of predicting unmonitored sensor signals using a prediction model, the computer-implemented method comprising:

receiving a historical dataset of sensor signal data relating to an environment of a sensor monitoring system, wherein the historical dataset includes a first sensor signal data, a second sensor signal data, and input variables relating to the sensor monitoring system;

generating sensor signal responses relating to the first sensor signal data by applying a Gaussian process regression model to the historical dataset and sensor parameters;

generating a hierarchical Gaussian process model that jointly considers multi-dimensional covariance structures among the input variables, the first sensor signal data, and the second sensor signal data; and predicting, by the hierarchical Gaussian process model, signal values relating to the second sensor signal data at time periods where the second sensor signal data was not monitored at using the sensor signal responses.

2. The computer-implemented method of claim 1, further comprising:

generating a surrogate prediction model for the sensor monitoring system to provide a framework for transitioning the sensor monitoring system to a different environment;

training the surrogate prediction model using the historical dataset and a second historical dataset, wherein the second historical dataset includes other first sensor signal data and other second sensor signal data relating to a second application;

quantifying an uncertainty relating to the sensor monitoring system in the different environment using the surrogate prediction model and unspecified parameters of sensors in the sensor monitoring system relating to the different environment;

computing parameter settings of unknown parameters relating to the different environment by applying a kriging technique to known parameters of the different environment; and providing the surrogate prediction model with the computed parameter settings as the framework for the sensor monitoring system in the different environment.

3. The computer-implemented method of claim 1, further comprising:

determining prediction errors relating to the sensor parameters by performing a cross-validation of the sensor signal responses with the signal values to provide a feedback control to the sensor monitoring system;

plotting the prediction errors with all sensor parameters provided by the sensor monitoring system;

determining the prediction errors exceeding a predetermined threshold; and adjusting a reporting frequency for sensors in the sensor monitoring system based on the prediction errors exceeding the predetermined threshold.

4. The computer-implemented method of claim 1, wherein generating the hierarchical Gaussian process model comprises:

sorting the first sensor signal data and the second sensor signal data in a descending order based on their monitoring frequencies to portray their hierarchical structure;

determining a covariance among the input variables and a highest time frequency signal data at a first level of the hierarchical structure;

producing a second level of the hierarchical structure using the covariance of the highest time frequency sensor signal data and the covariance of a second highest time frequency sensor signal data; and applying additional levels to the hierarchical structure until covariances of two lowest time frequency sensor signal data is added to a level.

5. The computer-implemented method of claim 1, wherein the hierarchical Gaussian process model predicts sensor signal data relating to the second sensor signal data based on a correlation between the first sensor signal data and the second sensor signal data.

6. The computer-implemented method of claim 1, wherein the hierarchical Gaussian process model jointly considers multi-dimensional covariance structures among the input variables, the first sensor signal data, and the second sensor signal data.

7. The computer-implemented method of claim 1, wherein a posterior prediction of the hierarchical Gaussian process model imputes missing sensor data in the sensor monitoring system.

8. A computer program product of predicting low-frequency sensor signal predictions using a prediction model, the computer program product comprising:
one or more computer readable storage medium, and program instructions stored on the one or more computer readable storage media, the program instructions comprising:
program instructions to receive a historical dataset of sensor signal data relating to an environment of a sensor monitoring system, wherein the historical dataset includes a first sensor signal data, a second sensor signal data, and input variables relating to the sensor monitoring system;
program instructions to generate sensor signal responses relating to the first sensor signal data by applying a Gaussian process regression model to the historical dataset and sensor parameters;
program instructions to generate a hierarchical Gaussian process model that jointly considers multi-dimensional covariance structures among the input variables, the first sensor signal data, and the second sensor signal data; and
program instructions to predict, by the hierarchical Gaussian process model, signal values relating to the second sensor signal data at time periods where the second sensor signal data was not monitored at using the sensor signal responses.

9. The computer program product of claim 8, further comprising:
program instructions to generate a surrogate prediction model for the sensor monitoring system to provide a framework for transitioning the sensor monitoring system to a different environment;
program instructions to train the surrogate prediction model using the historical dataset and a second historical dataset, wherein the second historical dataset includes other first sensor signal data and other second sensor signal data relating to a second application;
program instructions to quantify an uncertainty relating to the sensor monitoring system in the different environment using the surrogate prediction model and unspecified parameters of sensors in the sensor monitoring system relating to the different environment;
program instructions to compute parameter settings of unknown parameters relating to the different environment by applying a kriging technique to known parameters of the different environment; and program instructions to provide the surrogate prediction model with the computed parameter settings as the framework for the sensor monitoring system in the different environment.

10. The computer program product of claim 8, further comprising:
program instructions to determine prediction errors relating to the sensor parameters by performing a cross-validation of the sensor signal responses with the signal values to provide a feedback control to the sensor monitoring system;
program instructions to plot the prediction errors with all sensor parameters provided by the sensor monitoring system;
program instructions to determine the prediction errors exceeding a predetermined threshold; and
program instructions to adjust a reporting frequency for sensors in the sensor monitoring system based on the prediction errors exceeding the predetermined threshold.

11. The computer program product of claim 8, wherein the program instructions to generate the hierarchical Gaussian process model comprise:
program instructions to sort the first sensor signal data and the second sensor signal data in a descending order based on their monitoring frequencies to portray their hierarchical structure;
program instructions to determine a covariance among the input variables and a highest time frequency signal data at a first level of the hierarchical structure;
program instructions to produce a second level of the hierarchical structure using the covariance of the highest time frequency sensor signal data and the covariance of a second highest time frequency sensor signal data; and
program instructions to apply additional levels to the hierarchical structure until covariances of two lowest time frequency sensor signal data is added to a level.

12. The computer program product of claim 8, wherein the hierarchical Gaussian process model predicts sensor signal data relating to the second sensor signal data based on a correlation between the first sensor signal data and the second sensor signal data.

13. The computer program product of claim 8, wherein the hierarchical Gaussian process model jointly considers multi-dimensional covariance structures among the input variables, the first sensor signal data, and the second sensor signal data.

14. The computer program product of claim 8 wherein a posterior prediction of the hierarchical Gaussian process model imputes missing sensor data in the sensor monitoring system.

15. A system for predicting low-frequency sensor signal predictions using a prediction model, the system comprising:
a memory;
a processor;
local data storage having stored thereon computer executable code;
a historical dataset of sensor signal data relating to an environment of a sensor monitoring system, wherein the historical dataset includes a first sensor signal data, a second sensor signal data, and input variables relating to the sensor monitoring system;
a Gaussian process regression model configured to generate sensor signal responses relating to the first sensor signal data; and a hierarchical Gaussian process model configured to predict signal values relating to the second sensor signal data at time periods where the second sensor signal data was not monitored at using the sensor signal responses, wherein the hierarchical Gaussian process model jointly considers multi-dimensional covariance structures among the input variables, the first sensor signal data, and the second sensor signal data.

16. The system of claim 15, further comprising:

a feedback control configured to perform a cross-validation of the sensor signal responses with the signal values to determine a prediction error relating to sensor parameters; and wherein the feedback control is further configured to adjust a reporting frequency for sensors based on the prediction error.

17. The system of claim 15, further comprising:

a model updating framework configured to update the Gaussian process regression model and the hierarchical Gaussian process model applied to a second application for the sensor monitoring system based on an uncertainty computed by a surrogate prediction model.

18. The system of claim 15, wherein the hierarchical Gaussian process model predicts sensor signal data relating to the second sensor signal data based on a correlation between the first sensor signal data and the second sensor signal data.

19. The system of claim 15, wherein the hierarchical Gaussian process model jointly considers multi-dimensional covariance structures among the input variables, the first sensor signal data, and the second sensor signal data.

20. The system of claim 15, wherein a posterior prediction of the hierarchical Gaussian process model imputes missing sensor data in the sensor monitoring system.

* * * * *